United States Patent
Lengeling et al.

(10) Patent No.: US 7,603,623 B1
(45) Date of Patent: Oct. 13, 2009

(54) USER INTERFACE TO AUTOMATICALLY CORRECT TIMING IN PLAYBACK FOR AUDIO RECORDINGS

(75) Inventors: Gerhard Lengeling, Los Altos, CA (US); Sol Friedman, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 937 days.

(21) Appl. No.: 11/035,436

(22) Filed: Jan. 7, 2005

(51) Int. Cl.
*G06F 13/00* (2006.01)
*G06F 15/00* (2006.01)

(52) U.S. Cl. ................................ 715/725; 715/728

(58) Field of Classification Search ......... 715/700–713, 715/725–728, 851–853
See application file for complete search history.

(56) References Cited

U.S. PATENT DOCUMENTS 6,121,533 A * 9/2000 Kay .............................. 84/616
2002/0152877 A1 * 10/2002 Kay .............................. 84/609

* cited by examiner

*Primary Examiner*—Kevin (Cao) Nguyen
(74) *Attorney, Agent, or Firm*—Blakely, Sokoloff, Taylor & Zafman LLP

(57) ABSTRACT

Methods to automatically correct timing of recorded audio in GUI are summarized here. One or more controls to adjust resolution of timing and degree of correction for the audio are displayed. The resolution of timing relates to beats on a grid and is affected by the degree of correction. The degree of correction is mapped to a time interval at each beat along the grid. Next, a user manipulation of one or more controls selecting a resolution and a degree of correction is received. Correction of timing is performed according to the selected resolution and degree of correction. Correcting of timing may include aligning a transient of the audio to the beat by compressing or stretching a portion of the audio. Compressing or stretching the portion of the audio depends on a length of the portion relative to a distance between adjacent beats.

9 Claims, 10 Drawing Sheets

USER INTERFACE TO AUTOMATICALLY CORRECT TIMING IN PLAYBACK FOR AUDIO RECORDINGS

FIELD

Embodiments of the invention relate to a graphical user interface ("GUI"). More particularly, embodiments of the invention relate to methods to automatically correct timing of an audio data stream in a graphical user interface.

BACKGROUND

The graphical user interface ("GUI") is a computer interface that uses graphic icons and controls in addition to text to provide interaction between a user and a computer. A user of the computer utilizes a keyboard, a pointing device, e.g., a mouse, to manipulate the icons and controls. A user interacts through the GUI with the hardware and software of the computer system to cause the computer to perform actions, e.g., to create, manipulate, or modify various signals. With the increasing use of multimedia as part of the GUI, sound, voice, motion video, and virtual reality interfaces become a part of the GUI for many applications. One of such multimedia activity relates to audio signals. The audio signals may be produced and modified as desired to create audio performances, soundtracks, special effects, and the like. For example, GarageBand (Trademark) produced by Apple Computer, Inc., uses sampled real musical instruments and synthesized instruments to create or modify a piece of music.

The audio signals, or sound may be in digital or in analog data format. The analog data format is normally electrical, wherein a voltage level represents the air pressure waveform of the sound. A digital data format expresses the air pressure waveform as a sequence of symbols, usually binary numbers. The audio signals presented in analog or in digital format may be processed for various purposes, for example, to correct timing of the audio signals. Present methods to correct timing, however, require knowledge of an exact original location in time of the audio signal, meaning that the present methods operate with discrete audio events, having the original position in time already defined.

In current graphical user interfaces, to correct timing of a discrete audio event, a user manually moves a discrete audio event from the original time to a designated time on a grid, like it is performed in the Musical Instrument Digital Interface ("MIDI") protocol. FIG. 1 illustrates a typical prior art method of aligning a discrete audio event to a designated time on a grid. As shown in FIG. 1, the audio signal produced by a user is graphically represented on a display 100 as a sequence of discrete peaks ("audio events") 104, 105, and 106. The audio signal is not stored in a notational format; rather it is stored as a waveform. The discrete audio events produced by the user may be also graphically represented on a screen as a note over a staff. As shown in FIG. 1, in the original audio signal the event 104 and the event 106 are aligned to respective designated times 101 and 108 on the grid 102, whereas the event 105 is originally shifted from the designated time 107. The event 105 on an audio recording may represent a musician playing a note too soon, and it may be desired to correct this when playing back the recording. The user has to manually align each of the shifted events in the original audio signal to respective designated times on the grid 102. First, the user has to compare the position of the discrete audio event 105 relative the grid 102. Next, the user visually needs to determine that the audio event 105 is shifted relative to the designated time 107 on the grid 102. Next, the user needs to select each of the shifted audio events, for example, by click of a mouse, and then align each of the shifted audio events to the respective designated times by, for example, dragging the event 105 with a cursor 104 to align with the designated time 107, as shown in FIG. 1. Further, to produce a sound, a sound is triggered at the designated time 107, which is different from the original time that results in the sound played at a faster or slower speed depending on the original position of the event 105 relative to the designated time 107. Not only is the manual alignment process inconvenient, the mere moving of the audio event 105 to the designated time 107 on the grid 102 may cause undesirable side effects in playback of recorded audio, for example, pitch variations, clicks, and pops.

SUMMARY OF THE DESCRIPTION

Methods to automatically correct timing of recorded audio in a graphical user interface ("GUI") and a computer readable medium containing a program code to correct timing of recorded audio are disclosed. One or more controls to adjust a resolution of timing for correction of the audio and to adjust a degree of correction are displayed. The resolution of timing for correction defines beats on a grid. The degree of correction defines, in one embodiment, a maximum time interval for correction of the audio around each beat along the grid. The time interval for correction of the audio is mapped to the degree of correction. Mapping of the time interval to the degree of correction may be performed through a non-linear function, linear function, or a combination thereof. For one embodiment, the non-linear function to perform mapping includes at least one step. For one embodiment, a setting of a control to adjust resolution of timing is affected by the control to adjust the degree of correction.

Next, a user manipulation of at least one control to select a desired resolution of timing for correction and a desired degree of correction is received. Subsequently, correction of timing is performed according to the selected resolution and the selected degree of correction. For one embodiment, correction of timing includes detecting a portion of an audio data stream and aligning the portion of the audio data stream to the beat on the grid. For one embodiment, detecting the portion of the audio data stream includes detecting a position of a transient in the portion of the audio data stream relative to the beat on the grid. For another embodiment, detecting a portion of the audio data stream includes detecting a centrum of energy of the portion of the audio data stream relative to the beat on the grid. The aligning of the portion of the audio data stream to the beat on the grid includes compressing or stretching a portion of the audio stream depending on a distance (e.g. in time) between two adjacent portions of the audio data stream relative to a distance between respective adjacent beats on the grid. The portion of the audio data stream is compressed if the distance between two adjacent portions of the audio data stream is larger than the distance between the respective adjacent beats on the grid. The portion of the audio data stream is stretched if the distance between two adjacent portions of the audio data stream is smaller than the distance between the respective adjacent beats on the grid.

For one embodiment, performing correction of timing includes weighing the portion of the audio data stream based on proximity of the portion of the audio data stream to the grid and on the energy of the portion. The portion of the audio data stream, which is closest to the grid and has more energy, is aligned to the grid.

For one embodiment, the portion of the transient in the portion of the audio data stream to align to the grid may be selected by a control. For another embodiment, a degree of alignment of the portion of the audio data stream, meaning how far away from the grid may be the portion of the audio data stream after correcting is performed, may be selected by a control.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with references to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "one embodiment", "another embodiment", or "an embodiment" means that a particular feature, structure, or characteristic described in connection with the embodiment is included in at least one embodiment of the present invention. Thus, the appearance of the phrases "for one embodiment" or "for an embodiment" in various places throughout the specification are not necessarily all referring to the same embodiment. Furthermore, the particular features, structures, or characteristics may be combined in any suitable manner in one or more embodiments.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2005.

Methods to automatically enhance (e.g. correct) timing of recorded audio in a graphical user interface ("GUI") and a system having a computer readable medium containing a program code for automatic time correction in the GUI are described below.

Figure 1:
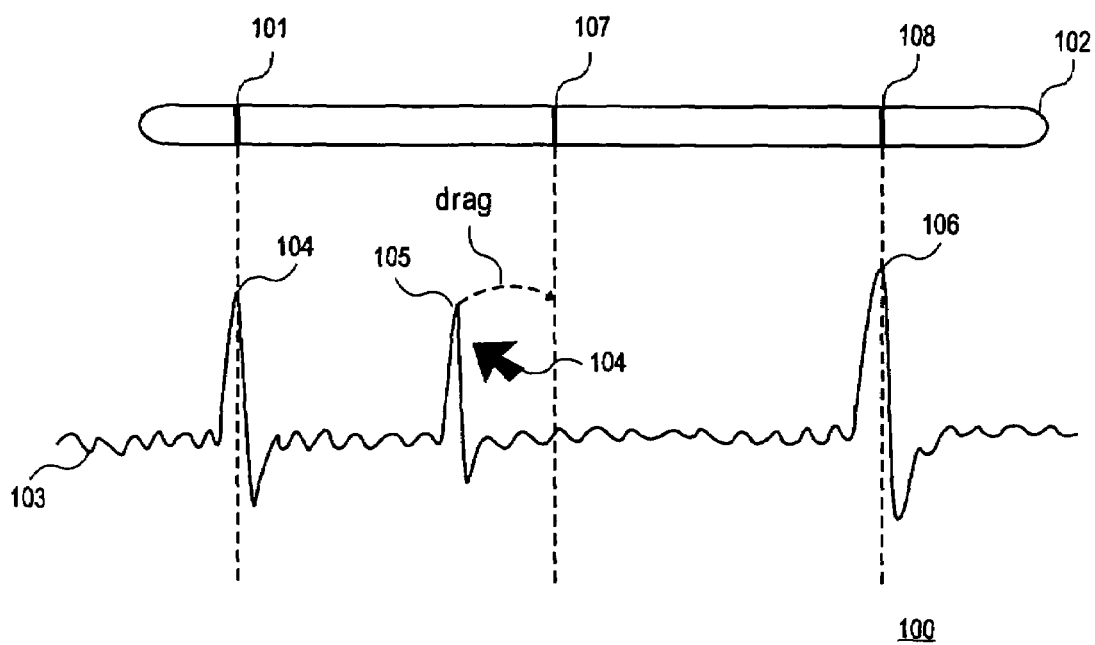
FIG. 1 illustrates a typical prior art method of aligning a discrete audio event (in a stored audio waveform) to a designated time on a grid.
Figure 2:
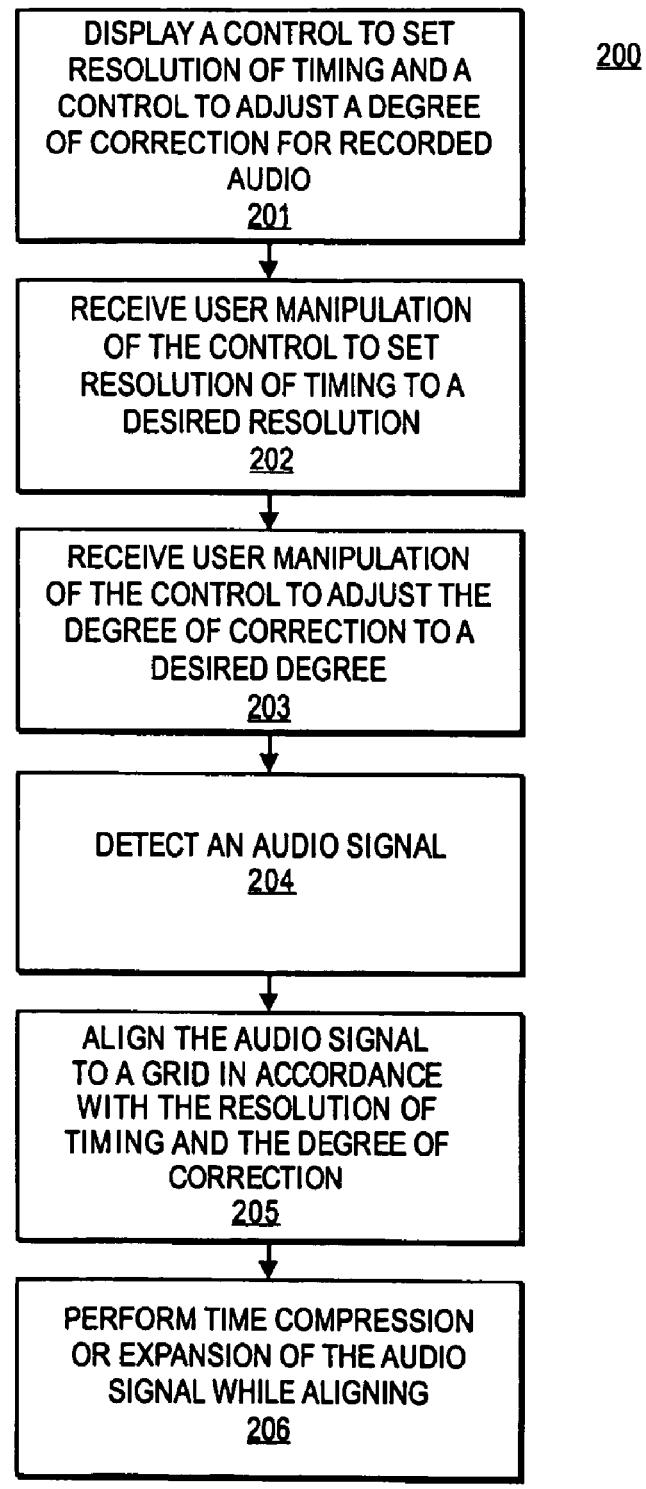
FIG. 2 is a flowchart of a method to automatically correct timing for an audio according to one embodiment of the invention.

FIG. 2 is a flowchart of a method to automatically correct timing for an audio according to one embodiment of the invention. The method 200 begins with displaying 201 at least one control to automatically correct timing, such as a control to set resolution of timing and a control to adjust a degree of correction of timing ("intensity"). For one embodiment, the audio is a playback of a recorded audio data stream, wherein at least a portion of the recorded audio data stream is not synchronized with a desired rhythm, for example, with beats of a metronome (e.g. a musician played a note too soon or too late). For one embodiment, the recorded audio data stream is music, wherein at least a portion of the music, for example, at least one note, is played out of sync with a desired rhythm. For another embodiment, the recorded audio data stream may be a voice, or any other sound and it may be a digitized audio waveform.

Figure 3:
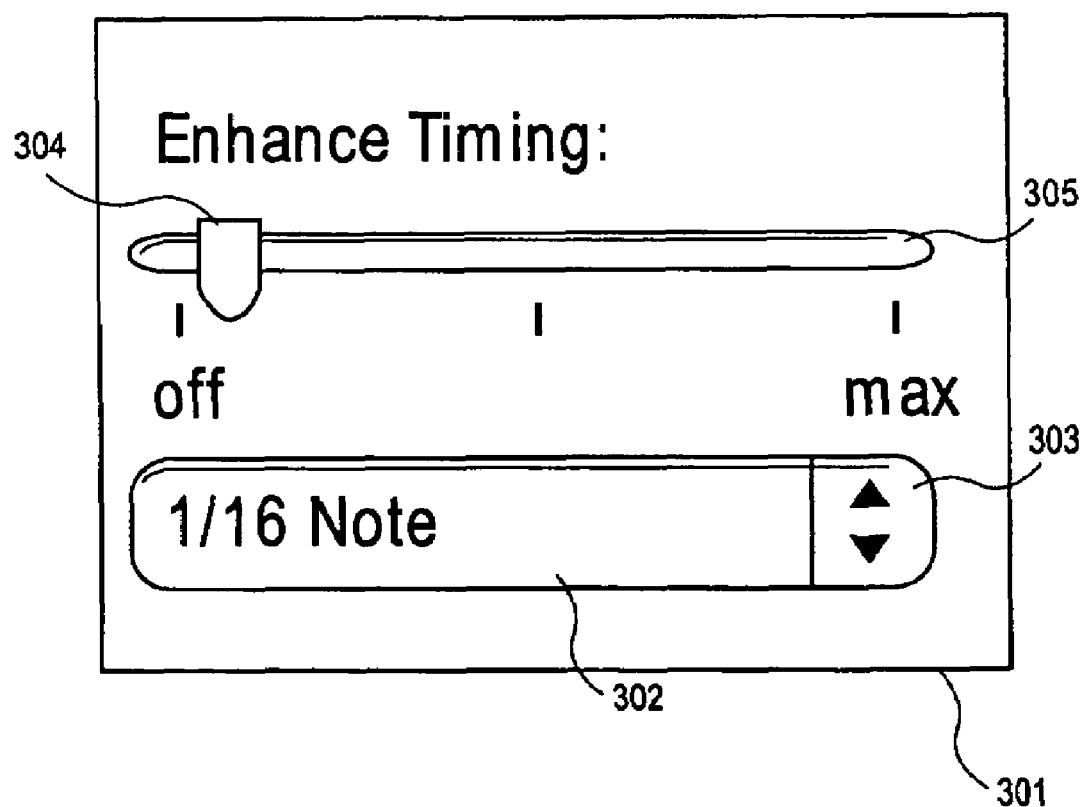
FIG. 3 illustrates a control window in a graphical user interface to enhance timing for an audio according to one embodiment of the invention.

FIG. 3 illustrates a control window 301 in a graphical user interface 300 to enhance timing for an audio recording according to one embodiment of the invention. As shown in FIG. 3, a control 302 to set resolution of timing and a control 305 to adjust a degree of correction for the audio are displayed within the control window 301. The control 302 allows a user to select a desired resolution of timing from a menu. For one embodiment, wherein the audio is a playback of the music, the menu may include resolution of $1/16^{th}$ note, $1/12^{th}$ note, $1/8^{th}$ note, $1/4^{th}$ note, $1/2$ note, or the like. For one embodiment, the menu including various resolutions of timing is a pop-up menu, which appears when menu arrows 303 are selected by, for example, positioning a cursor over the menu arrows 303 and pressing and release a button of a mouse. The control 305 has a slider 304 to adjust the degree of correction for the recorded audio, as shown in FIG. 3. The slider 304 may be moved along a bar indicator from off position to a maximum intensity position, as shown in FIG. 3. For one embodiment, the correction of the audio is not performed when the slider 304 is in "off" position, and the degree of correction for the audio is highest, when the slider 304 is in "maximum intensity" position on the bar indicator. For one embodiment, the degree of correction, which determines a position of the slider 304 along the bar indicator, may vary from 0 percent of intensity to 100 percent of intensity. For an embodiment, the slider 304 is moved along the control 305 using the cursor and a mouse or other cursor control device. For an embodiment, the control window 301 may include a control to adjust a degree of alignment of the audio signal to a desired timing, as described in further details below with respect to FIGS. 2 and 7. For yet another embodiment, the control window 301 may include a control to select a portion of the audio signal to align to a desired timing, as described in further details below with respect to FIGS. 2 and 9. It will be appreciated that, in alternative embodiments, the user interface may use only one control (e.g. an intensity control) which automatically selects both the amount of the correction and the resolution or merely selects the amount of the correction (with a fixed, predetermined resolution).

Referring back to FIG. 2, the method 200 continues with the operation 202 of receiving a user manipulation of the control to set the resolution of timing to a desired resolution and with the operation 203 of receiving a user manipulation of the control to adjust the degree of correction of timing to a desired degree. For alternate embodiments, the operation 202 and the operation 203 may be performed in serial, or in the same time. For one embodiment, the user manipulation to set the resolution of timing includes selecting a desired resolution of timing using a pop-up menu and the user manipulation to adjust the degree of correction for the audio includes moving a slider along a bar indicator to a desired position. Next, the operation 204 of detecting an audio signal is performed. For one embodiment, the detecting includes detecting a transient in an audio data stream. More specifically, the transient may be detected by identifying a change in an amount of energy during a unit of time. The detecting the transient may include determining a position of the transient in the audio data stream relative to the grid. For yet another embodiment, the detecting of an audio signal may be performed by identifying a centrum of energy in the audio signal. Next, the operation 205 of aligning the audio signal to a timing grid according to the selected resolution of timing and the adjusted degree of correction is performed. For one embodiment, the aligning the audio signal to a timing grid includes determining a portion of the transient to be aligned to the timing grid in response to the user manipulation, which is described in further details below with respect to FIG. 9. For another embodiment, aligning of the transient of the audio signal includes determining a degree of the alignment of the transient to the timing grid in response to the user manipulation, which is described in further details below with respect to FIG. 7. Further, the method 200 includes the operation 206 of performing time compression or time expansion while aligning.

Figure 4:
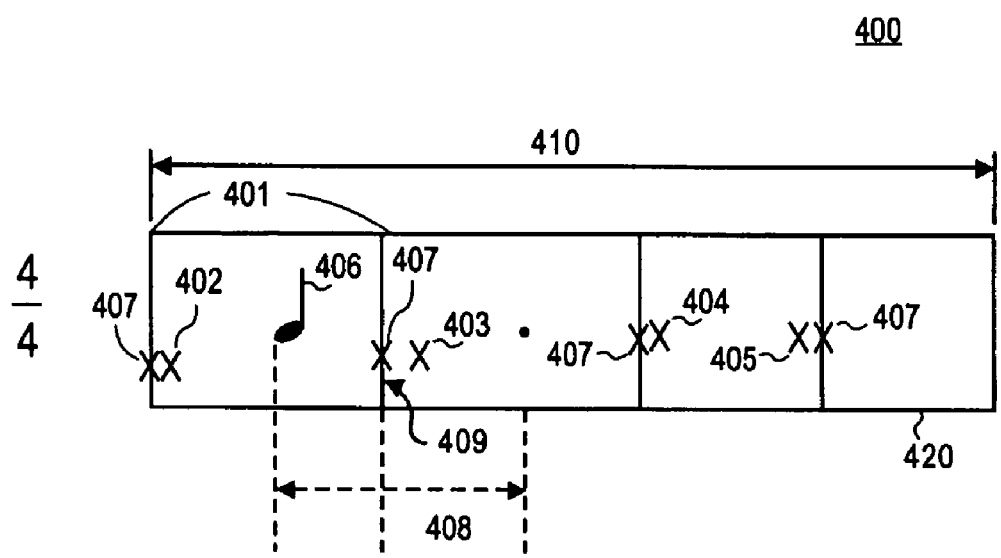
FIG. 4 illustrates correction of timing for an audio data stream, wherein at least a portion of the audio data stream is played out of sync with a desired rhythm according to one embodiment of the invention.

FIG. 4 illustrates correction of timing for an audio data stream, wherein at least a portion of the audio data stream is played out of sync with a desired rhythm according to one embodiment of the invention. A timing grid 420 defines a desired rhythm ("tempo") for the audio data stream, as shown in FIG. 4. For one embodiment, the desired rhythm is represented by beats 407 of a metronome aligned to grid lines of a timing grid 420. The distance 401 between adjacent grid lines of timing grid 420 defines a unit of time, or resolution of timing. For one embodiment, the distance 401 between adjacent grid lines corresponds to a quarter note 406, as shown in FIG. 4. A distance 410 including four quarter notes represents a measure ("4/4"), as shown in FIG. 4. For alternate embodiments, the distance 401 between adjacent grid lines of the timing grid 420 may correspond to a half note, a quarter note, an eighth note, a twelfth note ("quarter note triplets"), a sixteenth note, a $1/32^{nd}$ note, or the like. As shown in FIG. 4, in the playback of the audio data stream, a note 402, a note 403, and a note 404 are delayed in time relative to the beats 407 on respective closest grid lines, and a note 405 is played earlier relative to the beat 407 on a respective closest grid line of the timing grid 420. The degree of correction for the audio defines a time interval centered at a grid line of the timing grid 420. As shown in FIG. 4, a time interval 408 is centered on a grid line 409 of the timing grid 420 and extends in opposite directions from the grid line 409. The degree of correction for the audio data stream defines time interval 408, meaning that for a preset resolution of timing, a portion of the audio data stream, e.g., a note, which is played within the time interval 408, is corrected. The notes that are played outside the time interval 408 are left intact (e.g. no correction of timing relative to grid line 409 is made for the notes outside of time interval 408). More specifically, the portion of the audio data stream, e.g., the note, which is played within the time interval 408, is corrected by aligning to a closest grid line of the timing grid 420 (in the case, grid line 409). For example, the degree of correction of 100% (e.g. set by the "max" position on control 305) for a preset resolution of timing corresponds to the time interval 408 equal to the distance 401 between two adjacent grid lines of the timing grid 420. The degree of correction of one hundred percent ("100%") for a preset resolution of timing means that notes playing (uncorrected) within a half ("50%") of the distance 401 on either side of the grid line 409, are aligned to the grid line 409. As another example, the degree of correction of thirty percent ("30%") for a preset resolution of timing means correcting notes which play within 15% of the distance 401 on either side of the grid line 409 and not correcting notes, which fall outside the time interval 408, e.g. not correcting the notes that fall at a distance, which is more than 15% of the distance 401 away from the grid line 409. Correcting the notes that fall within the time interval 408 while leaving intact the notes that fall outside the time interval 408 may change resolution of timing. As such, a setting of a control of the resolution of timing may be affected by the setting of the control of the intensity in certain embodiments. For any resolution of timing, the time interval 408 for correction may be mapped to the degree of correction set by the control 305 of FIG. 3.

Figure 5A:
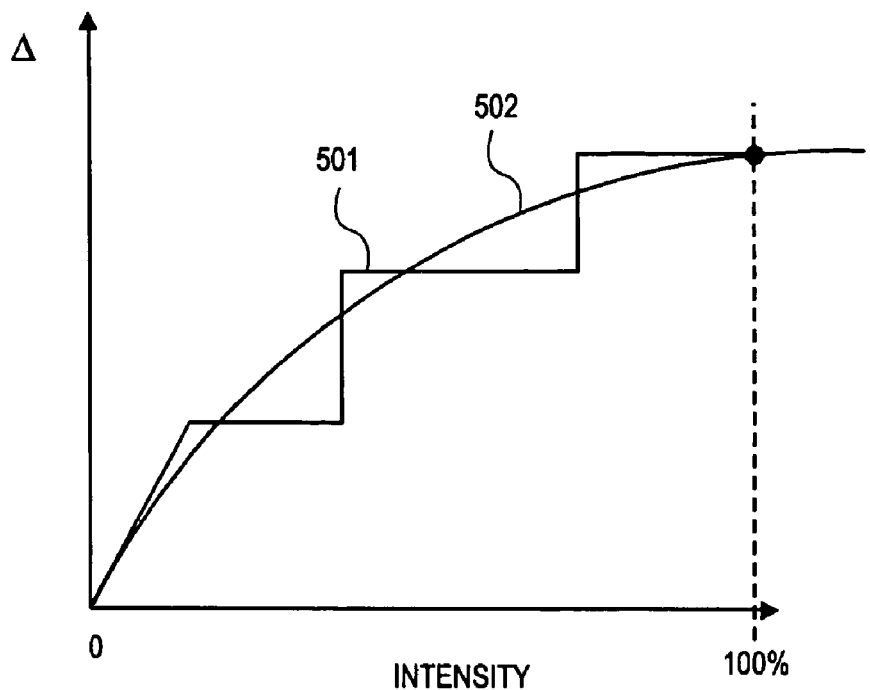
FIGS. 5A and 5B illustrate mapping of an actual distance for correction to a degree of correction set by the control according to one embodiment of the invention.
Figure 5B:
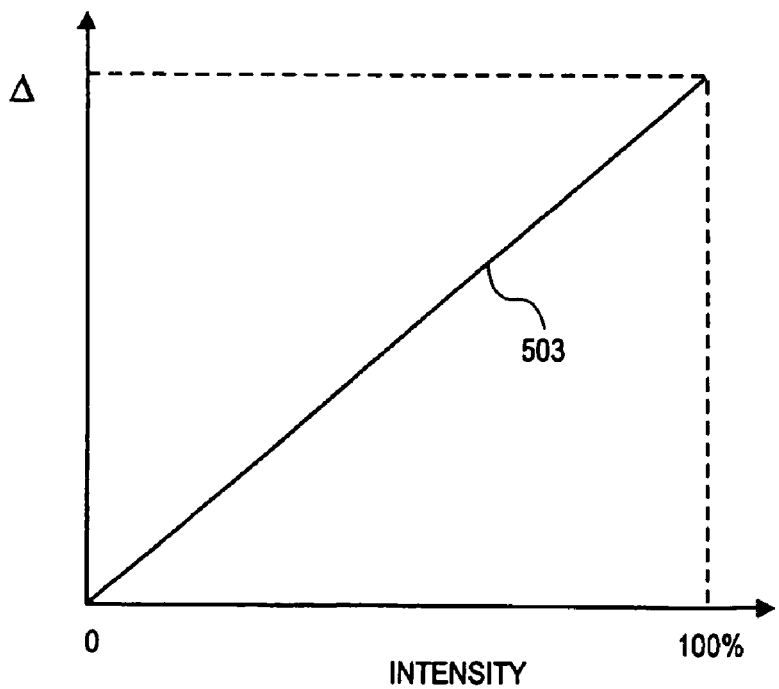

FIGS. 5A and 5B illustrate several mappings 500 of a distance Δ for correction to a degree of correction ("intensity") set by the control according to one embodiment of the invention. The mapping 500 is provided at a preset resolution of timing. For an embodiment, the mapping 500 may be different for each preset resolution of timing. The intensity (e.g. x axis in FIGS. 5A and 5B) is typically set, at least in certain embodiments by the position of the slider 304 on the control 305, and the distance Δ in FIGS. 5A and 5B is an actual distance in time to a closest beat at either side of the grid line of the timing grid 420 to which a portion of the audio, e.g., a note, will be aligned. In other words, the distance Δ which is determined by a mapping determines the time interval 408 described above with respect to FIG. 4. The distance Δ at a preset resolution of timing may be mapped to the intensity through a non-linear function 502 or 501, as shown in FIG. 5A. For example, the distance Δ may change faster at smaller values of intensity and change slower at larger values of intensity according to the non-linear function 502, shown in FIG. 5A. The non-linear function 502 that maps the distance Δ to the intensity may include at least one step, e.g., a function 501 shown in FIG. 5A. For yet another embodiment, the distance Δ is mapped to the intensity through a linear function 503. Generally, as shown in FIG. 5B, the distance Δ depends on the intensity ("I") through the linear expression Δ=A×I+B, wherein A is a constant parameter defining the slope of the linear function 503 and B is a constant parameter defining A when intensity is set to zero. More specifically, the linear function 503 may be expressed as Δ=2×I, meaning that by setting the intensity to 100% the distance Δ for correction may be plus or minus of 50% in either direction from the grid line of the timing grid. For example, if the resolution of timing is set to a quarter note, the distance Δ for correction may be plus or minus of an eighth note in either direction from a respective grid line on the timing grid. If the resolution of timing is set to a sixteenth note, the distance Δ for correction may be plus or minus of a thirty-second note in either direction from the respective grid line. The choice of the degree of the correction depends on how much correction of the audio is needed. For example, the more the audio is out of sync with a desired rhythm, the higher intensity may be needed to correct the timing, and vice versa.

Figure 6:
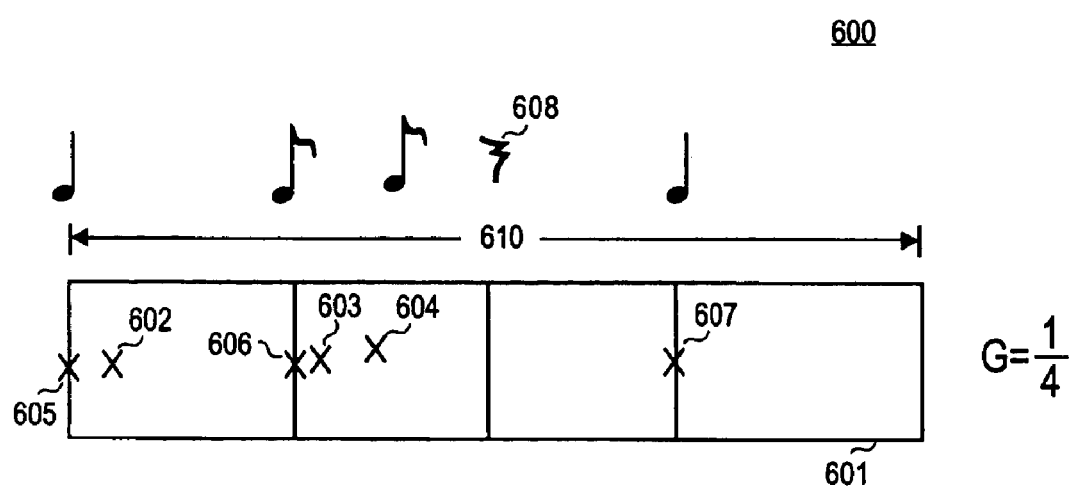
FIG. 6 illustrates correction of timing when a mixture of notes having various durations is played according to one embodiment of the invention.

FIG. 6 illustrates correction of timing when a mixture of notes having various durations is played according to one embodiment of the invention. As shown in FIG. 6, a timing grid 601 is a quarter note grid ("G=¼" as set by control 302), wherein a distance between adjacent grid lines corresponds to a quarter note. As shown in FIG. 6, a distance 610 including four quarter note intervals represents a measure ("4/4"). As shown in FIG. 6, a quarter note 602 is delayed with respect to a beat 605 on a closest grid line of the timing grid 601, an eighth note 603 is delayed with respect to a beat 606 on the closest grid line of the timing grid 601, and an eighth note 604 is further delayed with respect to the beat 606. A rest 608 follows the eighth note 604, and a quarter note 607 is played in alignment with a timing grid 601, as shown in FIG. 4. The correction of timing is performed on a portion of an audio data stream, which is out of sync with a desired rhythm and which is played within a time interval for correction, as described above with respect to FIG. 4. For example, the timing of the note 602 is corrected by aligning the note 602 to the beat 605, as shown in FIG. 4. If more than one portion of the audio data stream, e.g., more than one note, is played within the same time interval for correction, the portion of the audio data stream to be corrected is selected. For an embodiment, the selection of the portion may be performed by weighting of each of the portions of the audio data stream. Weighting of each of the portions of the audio data stream may be based on the proximity of the portion to the closest grid line of the timing grid 601, on an energy of the portion, or on both. For example, for the eighth note 603 and the eighth note 604, the correction of timing is performed for the note 603, which is closest to the respective grid line of the timing grid 601, leaving the note 604 intact, as shown in FIG. 4. For another embodiment, when the note 604 has more energy, e.g., is more loud, the correction of timing may be performed for the note 604 leaving the note 603 intact. For yet another embodiment, when the note 603 is closer to the respective grid line of the grid 601, but more quiet relative to the note 604, the selection of the note for correction of timing may be performed by comparing weighting parameters of the proximity to the grid 601 and of the energy for the note 603 and for the note 604. For yet another embodiment, to provide correction of timing for all notes when the intensity is adjusted to 100%, the timing grid 601 may be selected to correspond to the shortest unit of time in the played audio, e.g., to the shortest note played in the mixture of notes. For example, if the shortest note played in the mixture of notes is a sixteenth note and the intensity is adjusted to 100%, the timing grid is set to $1/16^{th}$ to provide correction of timing for all played notes.

Figure 7A:
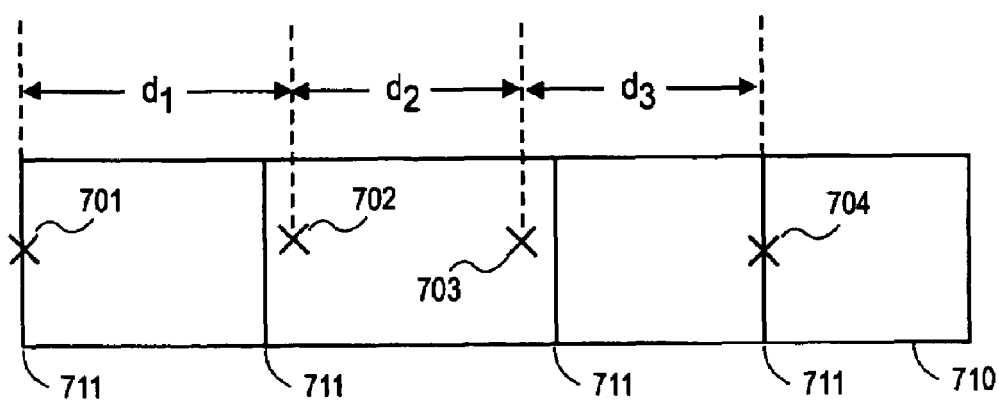
FIGS. 7A and 7B illustrate correction of timing using time compression and time expansion according to one embodiment of the invention.
Figure 7B:
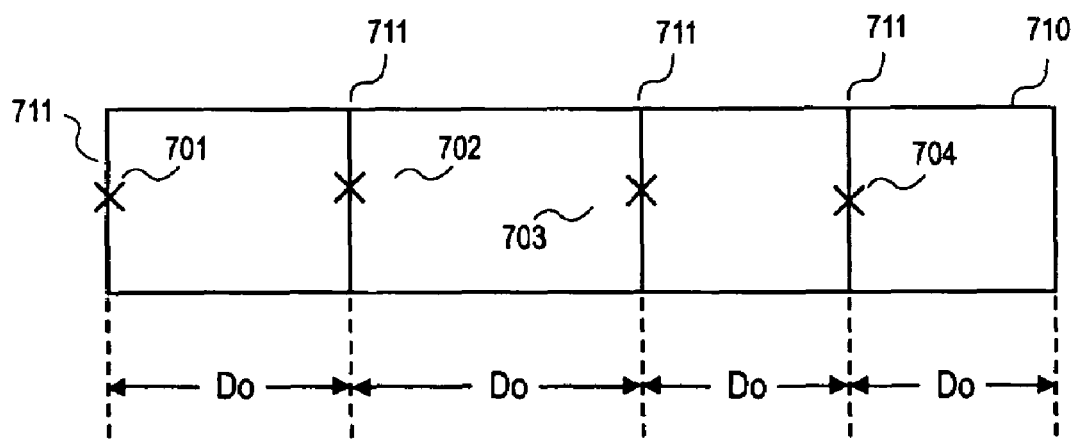

FIGS. 7A and 7B illustrate correction of timing using time compression and time expansion according to one embodiment of the invention. An example of time compression and time expansion of audio is described in U.S. Pat. No. 5,386,493. A distance between adjacent grid lines of a timing grid 710 corresponds to a quarter note, as shown in FIGS. 7A and 7B. FIG. 7A illustrates positions of the notes (from the recorded audio) along the grid 710 before correction of timing. A note 701 is played in time with the respective grid line 711 of the grid 710, a note 702 is delayed relative to the respective grid line 711, a note 703 is played earlier, and a note 704 is played in time relative to the respective grid line 711 of the grid 710, as shown in FIG. 7A. As shown in FIG. 7A, $d_1$ is a time interval between the note 701 and the note 702, $d_2$ is a time interval between the note 702 and the note 703, and $d_3$ is a time interval between the note 703 and the note 704. FIG. 7B illustrates positions of notes along the grid 710 after correcting of timing is performed. As shown in FIG. 7B, the note 701, the note 702, the note 703, and the note 704 are aligned with respective grid lines 701 of the grid 710. The distance between the notes after correcting of timing is equal to a distance $D_0$ between the adjacent grid lines 711 of the grid 710. For a single tempo the distance $D_0$ is a constant. The time interval $d_1$ is longer than the distance $D_0$ by the ratio of $d_1$ to $D_0$ ("$d_1/D_0$"), the time interval $d_2$ is shorter than the distance $D_0$ by the ratio of $d_2$ to $D_0$ ("$d_2/D_0$"), and the time interval $d_3$ is longer than the distance $D_0$ by the ratio of $d_3$ to $D_0$ ("$d_3/D_0$"). To align the notes 702 to 704 to the respective grid lines 711 of the grid 710, the time interval $d_1$ is compressed by $d_1/D_0$, the time interval $d_2$ is expanded by $d_2/D_0$, and the time interval $d_3$ is compressed by $d_3/D_0$, as shown in FIG. 7B. Expanding the time interval or compressing the time interval to align, for example, the note 703 to the grid 710 depends on respective positions of the adjacent note 702 and the note 704 relative to the note 703, as shown in FIGS. 7A and 7B. Aligning the notes to the grid 710 includes a series of stretches ("expansions") and compressions that depends on what happened previously in time, e.g., on a timing information for the preceding transient in the audio data stream, or the like. Techniques to perform time compressions and time expansions are known to one of ordinary skill in the art of audio recording. For an embodiment, the aligning the notes to the grid 710 may include determining the degree of the alignment, which defines how far off the grid 710 within the time interval for correction 408 described above with respect to FIG. 4 to position the note while performing the aligning. In other words, the degree of the alignment defines a target position of the note relative to the closest grid line of the grid 710 when correction of timing is performed. The degree of alignment is defined within the time interval for correction, which is set by adjusting the intensity.

Because, as described above with respect to FIGS. 4 and 6, the resolution of timing is affected in at least certain embodiments, by the degree of correction ("intensity"), setting the resolution of timing and adjusting the intensity are correlated to each other. For one embodiment, to perform correcting of timing when the timing grid 710 is not set to a shortest played note, the intensity may be adjusted accordingly to provide the correction of the notes within a specified time interval, which corresponds to the shortest played note. For example, when the timing grid 710 corresponds to a quarter note, whereas the shortest played note is an eighth note, the intensity may be adjusted to 50% to provide correction for the notes that fall within the time interval of +/−25% at either side of each of the grid lines 711, e.g., within the time interval of an eighth note.

Figure 8:
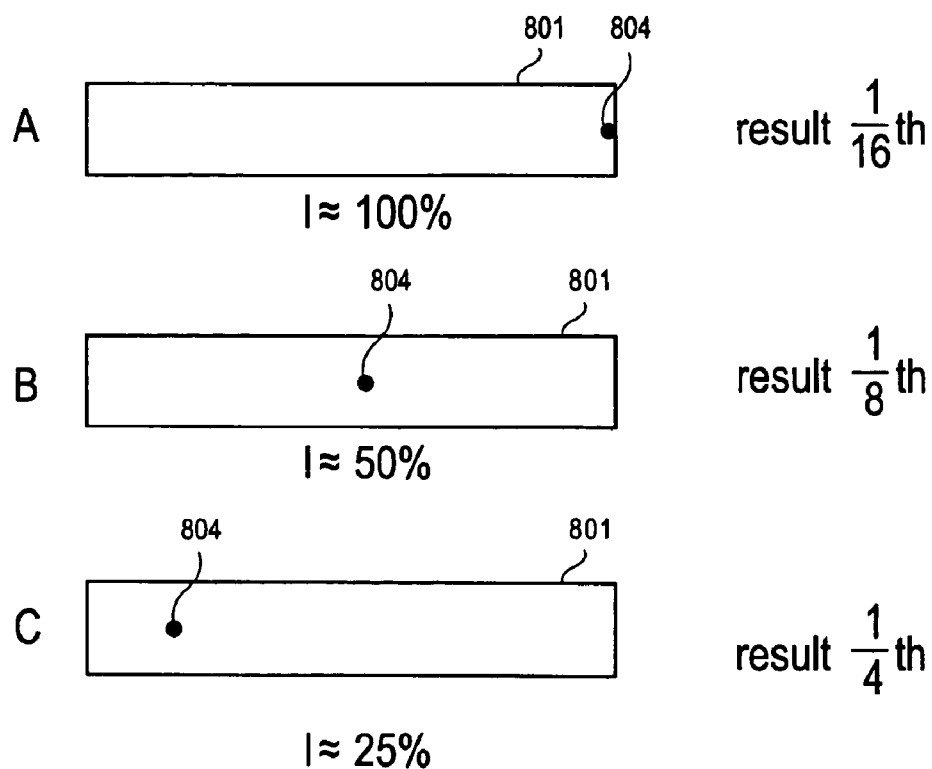
FIGS. 8A to 8C illustrate effect of the degree of correction on an actual resolution of timing grid according to one embodiment of the invention.

FIGS. 8A to 8C illustrate the effect of the degree of correction on an actual resolution of timing grid according to one embodiment of the invention. The setting of resolution of timing may be controlled indirectly through a control for intensity. As shown in FIG. 8A, setting the timing grid to one sixteenth note resolution and adjusting the intensity for example, to 100% by a slider 804 of a control 801, results in actual resolution of the timing grid of one sixteenth. As shown in FIG. 8B, setting the timing grid to one sixteenth resolution and adjusting the intensity, for example, to 50% results in actual resolution of the timing grid of one eighth. As shown in FIG. 8C, setting the timing grid to one sixteenth resolution and adjusting the intensity, for example, to 25%, results in actual resolution of the timing grid of one quarter. A combination of a setting of a control for the resolution of timing and a setting of a control for the intensity may be automatically selected without a user intervention to provide a user specific automatic correction of timing, for example, in a playback of a recorded audio.

Table 1 illustrates various combinations of settings of the control for the resolution of timing and settings of the control for the intensity that result in various actual resolutions of timing according to one embodiment of the invention. As illustrated in Table 1, selecting a timing grid and positioning the control in a predetermined intensity zone may result in automatic "snapping" of the notes to a closest grid line that may indirectly affect an actual resolution of timing. As such, there is a specific relationship, which is controlled by adjusting the intensity, between a timing grid selected by a user and the actual timing grid, which is implemented to automatically correct timing of the audio. As shown in Table 1, depending on an intensity zone the actual resolution of timing may change by a certain value, or percent relative to the initial selected settings. For example, setting the timing grid to one sixteenth resolution and adjusting the intensity in the approximate range ("zone") of 75% to 100% may result in actual resolution of the timing grid of one sixteenth; adjusting the intensity in the approximate range of 25% to 75% may result in actual resolution of the timing grid of one eighth; and adjusting the intensity in the approximate range of 0% to 25% may result in actual resolution of the timing grid of one quarter, as illustrated in Table 1. Further, setting the timing grid to one eighth resolution and adjusting the intensity in the approximate range of 75% to 100% may result in actual resolution of the timing grid of one eighth; adjusting the intensity in the approximate range of 25% to 75% may result in actual resolution of the timing grid of one quarter, and adjusting the intensity in the approximate range of 05% to 25% may also result in actual resolution of the timing grid of one quarter. For an embodiment, setting the timing grid to one quarter resolution may result in actual resolution of the timing grid of one quarter at any position of the intensity.

Figure 9:
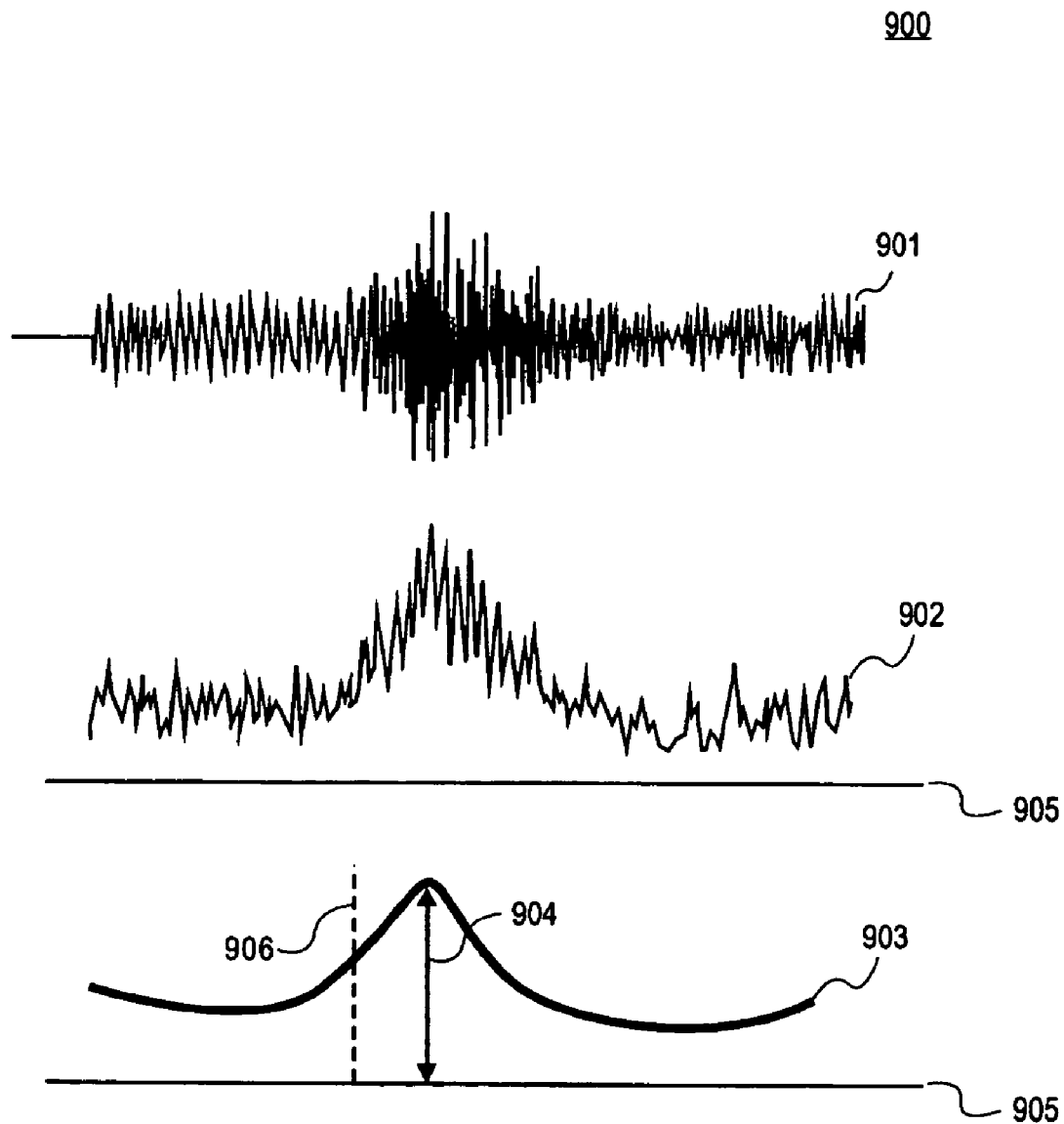
FIG. 9 illustrates selecting a portion of an audio waveform around a transient according to one embodiment of the invention.

FIG. 9 illustrates a portion of an audio waveform 901 around a transient according to one embodiment of the invention. The waveform 901 around the transient has a plurality of regions of rising and falling amplitudes, as shown in FIG. 9. For one embodiment, the audio waveform 901 may represent a spoken word, a piece of music, or any other sound. Curve 902 illustrates the energy distribution for the waveform 901 around the transient, and level 905 represents the level of zero energy, for example, a silence, or inactivity. Curve 903 illustrates a statistics of the energy distribution around the transient, for example, an "envelope" of the energy distribution curve around the transient. The curve 903 may be generated by smoothing the curve 902. For an embodiment, a portion 906 of the transient to be aligned to the timing grid according to the selected resolution and the intensity, may be selected in response to the user manipulation of a control in the GUI as described above with respect to FIGS. 2 and 3. For another embodiment, aligning of the transient of the audio signal includes determining a degree of the alignment of the transient to the timing grid in response to the user manipulation of a control in the GUI as described above with respect to FIGS. 2, 3, and 7.

Figure 10:
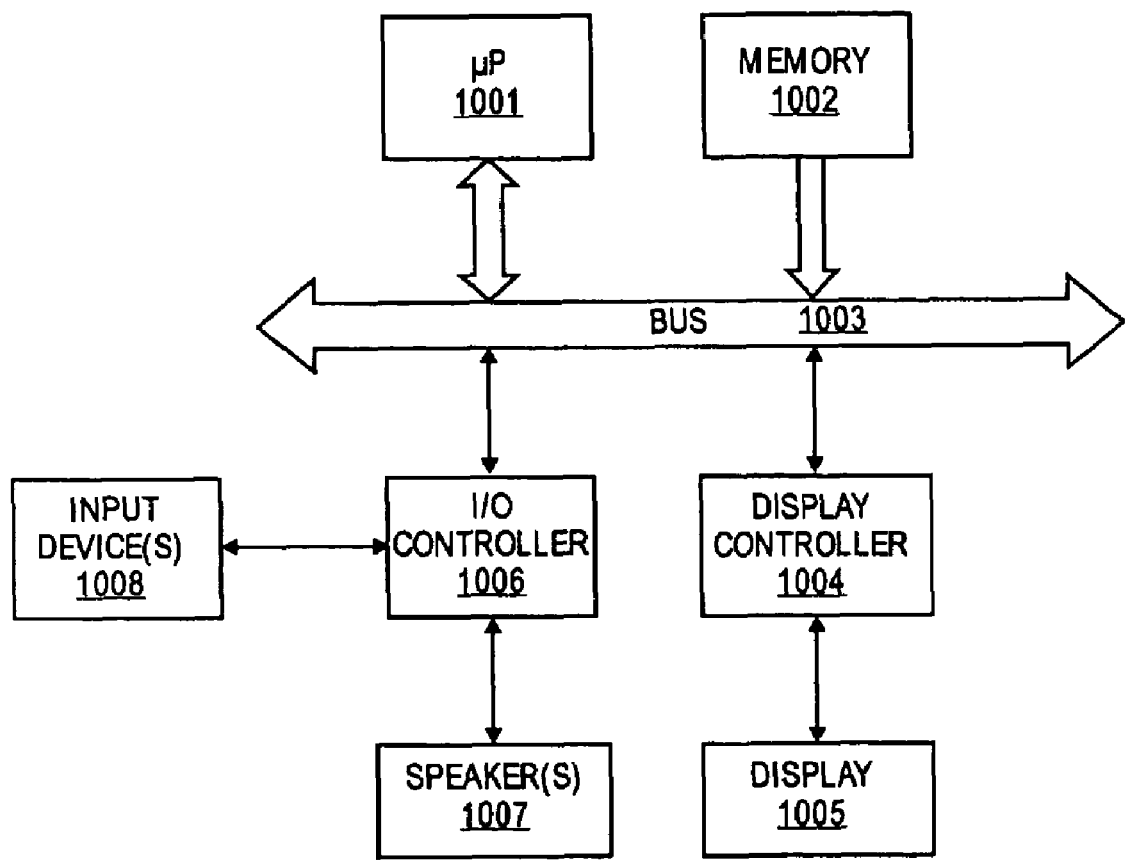
FIG. 10 illustrates an exemplary data processing system which may be used with at least some of the embodiments of the invention. A data processing system may be a general purpose, software controlled, computer of a special purpose computer which processes or plays music.

FIG. 10 shows a block diagram of a system 1000 that performs methods to correct timing in a playback of a recorded audio described above with respect to FIGS. 2-9 according to one embodiment of the invention. The system 1000 includes a microprocessor 1001 coupled to a bus 1003. Software that includes programs and data to perform methods described above with respect to FIGS. 2-9 is written onto a memory 1002, which is coupled to the microprocessor 1001 by the bus 1003. For one embodiment, the memory 1002 may be DRAM or a magnetic disk, a flash memory chip, a hard disk, a battery backed memory, an optical disk, or any combination thereof. For one embodiment, the memory 1002 may include a portable disk, such as a CD-ROM, a DVD, or a floppy disk. The microprocessor 1001 executes the software written onto the memory 1002 to perform the methods to correct timing in a playback of a recorded audio described above with respect to FIGS. 2-9. As shown in FIG. 10, the microprocessor 1001 and the memory 1002 are coupled through the bus 1003 to an input/output ("I/O") controller 1006 and to a display controller 1004. For one embodiment, the I/O controller 1006 is coupled to one or more input devices 1008 to provide a recorded audio. For one embodiment, the I/O controller 1006 is coupled to one or more speakers 1007, as shown in FIG. 10. For one embodiment, as shown in FIG. 10, the display controller 1004 is coupled to a display 1005 to show, for example, a control window with one or more controls described above with respect to FIG. 3.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

TABLE 1

"snapping"

| Input G | Intensity zone % | Result G |
|---------|------------------|----------|
| 1/16    | 75-100           | 1/16     |
| 1/16    | 25-75            | 1/8      |
| 1/16    | 0-25             | 1/4      |
| 1/8     | 75-100           | 1/8      |
| 1/8     | 25-75            | 1/4      |
| 1/8     | 0-25             | 1/4      |
| 1/4     | 75-100           | 1/4      |
| 1/4     | 25-75            | 1/4      |
| 1/4     | 0-25             | 1/4      |

What is claimed is:

1. A method to automatically correct timing in a playback of recorded audio, comprising:
   receiving a first selection of a desired resolution of timing;
   receiving a second selection of a desired degree of correction; and
   performing correction of timing according to the first selection and the second selection, wherein the first selection and the second selection are performed through at least one user control on a display device, wherein the performing the correction includes aligning at least a portion of the recorded audio to a timing grid, wherein the resolution of timing defines beats on a grid and the degree of correction defines a time interval for correction along the grid.

2. The method of claim 1 further comprising:
   mapping the time interval to the degree of correction.

3. The method of claim 1, wherein the performing correction of timing comprises
   detecting a transient in an audio stream; and
   aligning the transient to the grid.

4. An article of manufacture comprising:
   a machine-accessible medium including data that, when accessed by a machine, cause the machine to perform operations comprising,
   receiving a first selection of a desired resolution of timing;

receiving a second selection of a desired degree of correction; and performing correction of timing according to the first selection and the second selection, wherein the first selection and the second selection are performed through at least one user control on a display device, wherein the performing the correction includes aligning at least a portion of the recorded audio to a timing grid, wherein the resolution of timing defines beats on a grid and the degree of correction defines a time interval for correction at each beat along the grid.

5. The article of manufacture of claim 4, wherein the machine-accessible medium further includes data, when accessed, results in the machine performing operations comprising, mapping the time interval to the degree of correction.

6. The article of manufacture of claim 4, wherein the performing correction of timing comprises detecting a transient in an audio stream; and aligning the transient to a beat on the grid.

7. A system, comprising:

means for receiving a first selection of a desired resolution of timing;

means for receiving a second selection of a desired degree of correction; and means for performing correction of timing according to the first selection and the second selection, wherein the first selection and the second selection are performed through at least one user control on a display device, wherein the performing the correction includes aligning at least a portion of the recorded audio to a timing grid, wherein the resolution of timing defines beats on a grid and the degree of correction defines a time interval for correction at each beat along the grid.

8. The system of claim 7 further comprising:

means for mapping the time interval to the degree of correction.

9. The system of claim 7, wherein the means for performing correction of timing comprises means for detecting a transient in an audio stream; and means for aligning the transient to a beat on the grid.

\* \* \* \* \*

UNITED STATES PATENT AND TRADEMARK OFFICE
CERTIFICATE OF CORRECTION

PATENT NO. : 7,603,623 B1 Page 1 of 1
APPLICATION NO. : 11/035436
DATED : October 13, 2009
INVENTOR(S) : Lengeling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1316 days.

Signed and Sealed this

Fifth Day of October, 2010

David J. Kappos
*Director of the United States Patent and Trademark Office*